Feb. 22, 1955 R. M. PAGE 2,702,899
PULSE ECHO INDICATION SYSTEM
Filed Feb. 21, 1946 3 Sheets-Sheet 1
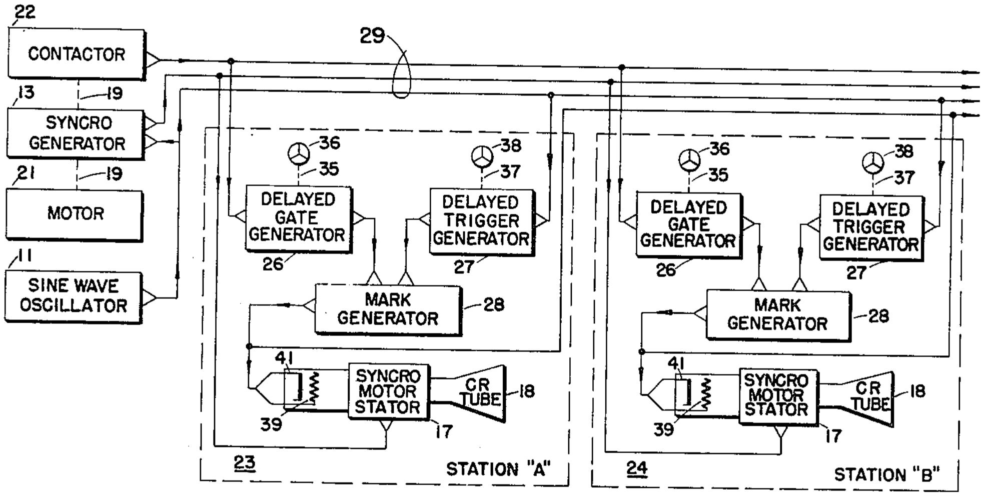
FIG. 2
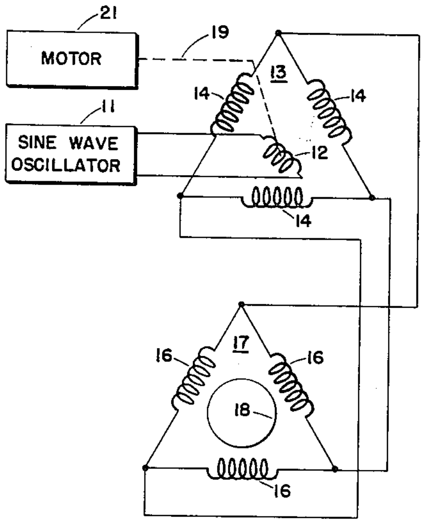
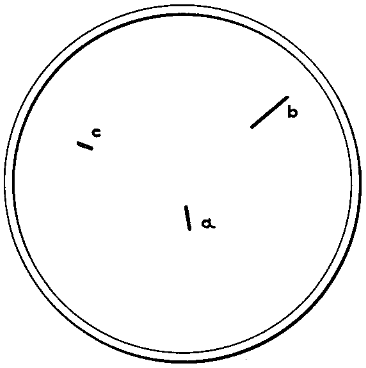
FIG. 3
FIG. 1
Inventor
ROBERT M. PAGE
By M. C. Hayes
Attorney INVENTOR.
ROBERT M. PAGE
BY M. C. Hayes
ATTORNEY INVENTOR.
ROBERT M. PAGE
BY M. O. Harris
ATTORNEY United States Patent Office 2,702,899

Patented Feb. 22, 1955

2,702,899

PULSE ECHO INDICATION SYSTEM

Robert M. Page, Washington, D. C.

Application February 21, 1946, Serial No. 649,438

3 Claims. (Cl. 343—11)

Figure 4:
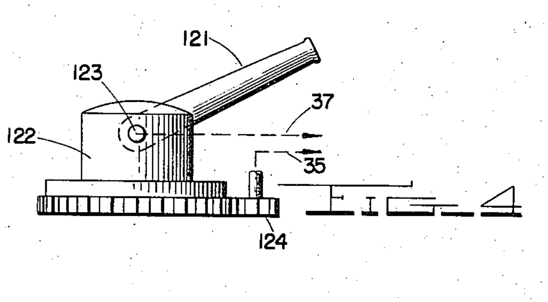

(Granted under Title 35, U. S. Code (1952), sec. 266)

This invention relates to visual communication and indicating system.

It is an object of the present invention to provide novel means for visual communication between two or more points.

Another object of the present invention is to provide a novel system for indicating in two coordinates the position of an object in two dimensions.

A further object of the present invention is to provide a novel visual communication or indicating system of the foregoing character in combination with a radio locator system of similar apparatuses.

Other objects and features of the invention will appear more fully from the following detailed description when considered in connection with the accompanying drawings. It is to be expressly understood, however, that the drawings are designed for purposes of illustration only and not as a definition of the limits of the invention.

In the drawings, wherein similar reference characters denote similar parts throughout the several views:

Fig. 1 is a diagrammatic showing of means for deflecting the electron beams of the cathode ray tubes in the system of Fig. 2, Fig. 2 is a diagrammatic showing of a visual communication system embodying the principles of the present invention.

Figure 5:
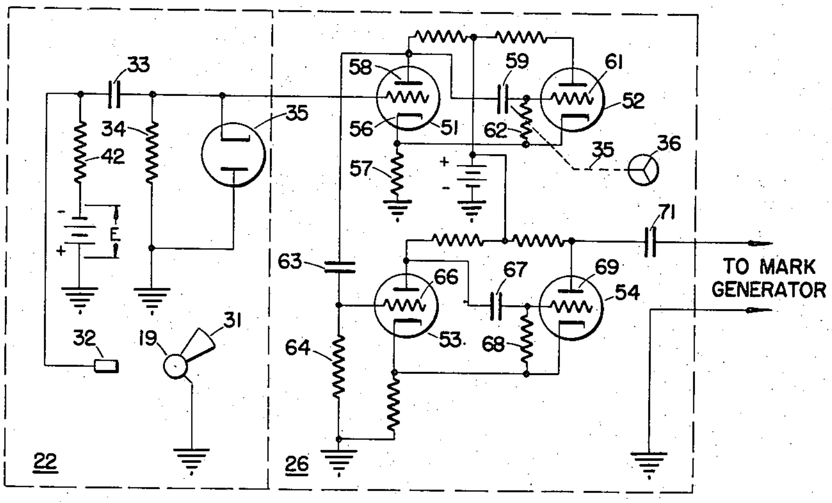
Figure 6:
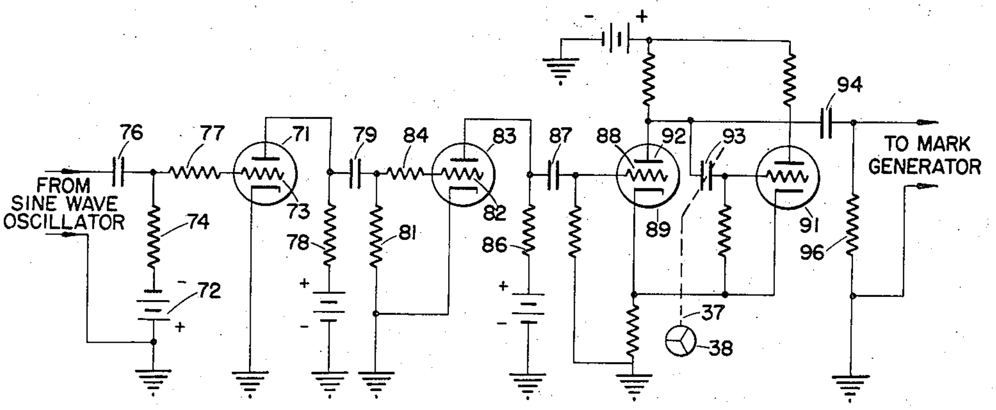
Figure 7:
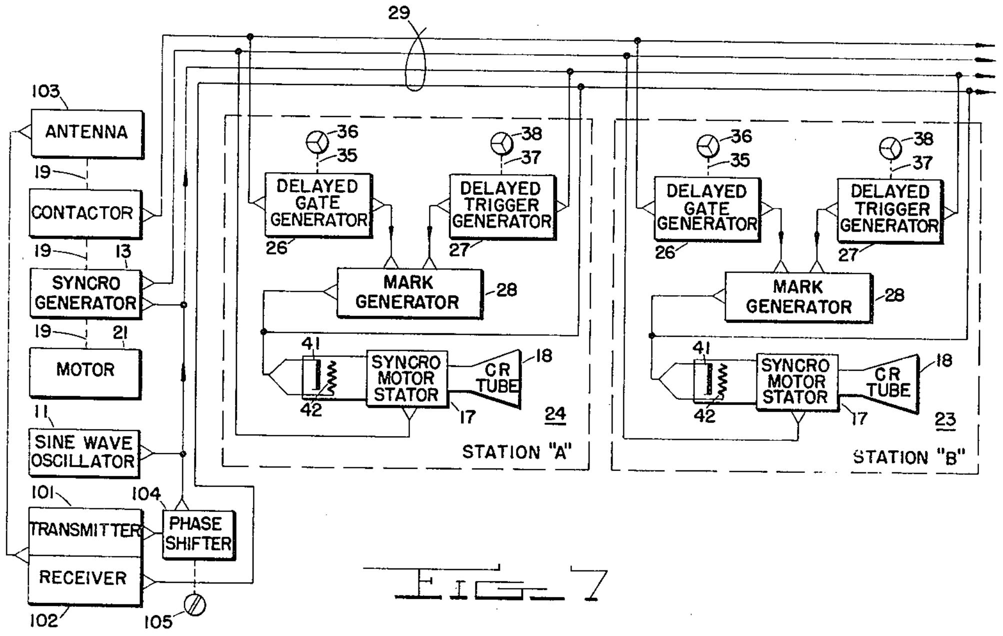
Figure 8:
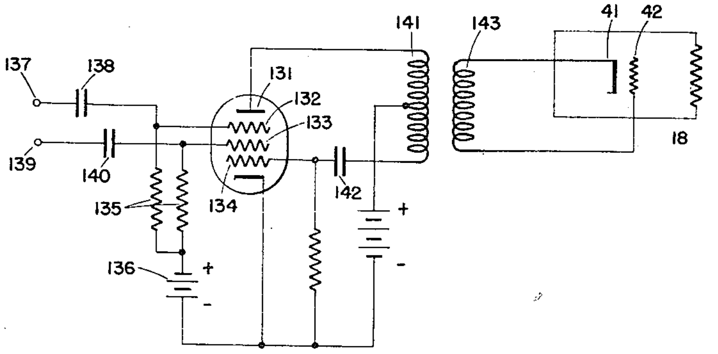

Fig. 3 is an illustration of the visual indication produced on the screen of a cathode ray tube incorporated in the system of Fig. 1, Fig. 4 typifies a gun and means connecting the mechanism thereof to the communication system of the invention, Fig. 5 illustrates means for varying the angular positions of the marks illustrated in Fig. 3, Fig. 6 illustrates means for varying the radial distance of the marks from the center of the screen, Fig. 7 shows the system of Fig. 2 in combination with a radio locator system, and Fig. 8 is a circuit of a suitable mark generator.

In accordance with the invention there is provided a cathode-ray tube, means deflecting the electron beam radially across the screen of said tube, means rotating at a constant angular velocity the direction of the deflection of said electron beam, contactor means rotating synchronously with said direction of said deflection, means deriving from said contactor an electrical discontinuity when said contactor traverses a fixed reference angle means adjustably delaying said discontinuity, means producing a voltage impulse when the amplitude of said deflection of said beam rises to a predetermined magnitude, means operative when the delayed discontinuity and said voltage impulse occur coincidentally to generate a signal which is applied to said cathode-ray tube to intensify said electron beam and thereby produce a visual reference indication on said screen in accordance with said signal, means adjustably controlling the angular position of said radial mark, adjustable means adjustably controlling the radial distance of said mark from the center of rotation of said deflection, means synchronously reproducing said reference indication on screens of a plurality of cathode-ray tubes, means producing a plurality of visually differentiated indications synchronously on the screens of a plurality of cathode-ray tubes, and means electrically interconnecting a plurality of cathode-ray tubes and a plurality of signal-generating and position-control means thereby providing means for transmitting visual intelligence between a plurality of points in accordance with the coordinates of said reference indications. Additionally, the invention provides in combination a radio locator system and a visual communication system of the type hereinbefore described, wherein both said reference indications and visual indications of remote objects appear on the screens of said cathode-ray tubes.

Referring now more particularly to Fig. 1, there is illustrated a satisfactory method of deflecting the electron beams of cathode-ray tubes incorporated in the present invention. The output voltages of a sine wave oscillator 11 is applied to the rotor coil 12 of a synchro generator 13. The stator coils 14 of synchro generator 13 are connected to the corresponding stator coils 16 of a synchro motor 17. The rotor of synchro motor 17 has been removed and replaced by the throat section of a cathode-ray tube 18 which is inserted in the space formerly occupied by said rotor. When the rotor coil is energized by sine wave oscillator 11, sine wave voltages are induced in stator coils 14, resulting in the flow of sine wave currents through stator coils 16 or synchro motor 17 in a manner familiar to those skilled in the art. The axis of the resultant magnetic field of stator coils 16 is in a direction which is determined by the angular position of rotor coil 12 of synchro generator 13. Consequently, the cathode ray is deflected transversely with simple harmonic motion in accordance with the sine wave variation of said resultant magnetic field, along an axis which bears a fixed angular relationship to the position of rotor coil 12 of synchro generator 13. Rotor coil 12 is mechanically connected through a shaft 19 to a motor 21 which turns at a constant angular velocity. Thus, the axis of deflection of the cathode ray rotates synchronously with rotor coil 12 of synchro generator 13 and with shaft 19.

A visual communication system in accordance with the invention will be described with reference to Fig. 2. The system comprises a sine wave oscillator 11, a motor 21, a synchro generator 13, a contactor unit 22, and one or more stations 23, 24. Each of the stations 23, 24, may comprise a delayed gate generator 26, a delayed trigger generator 27, a mark generator 28, a synchro motor stator 17, and necessary power-supply components (not shown). The rotatable element of the contactor unit 22 and the rotor coil of synchro generator 13 are rotated synchronously at constant angular velocity by motor 21 through a common shaft 19. The output voltage of the sine wave oscillator 11 is applied to the rotor coil of synchro generator 13. The stator coils of synchro generator 13 are connected to the corresponding coils of synchro motor stators which encircle the respective throat sections of cathode-ray tubes 18. As hereinbefore explained, the electron beams of cathode-ray tubes 18 are thereby deflected transversely across the screens with simple harmonic motion in accordance with the sine wave voltage output of the sine wave oscillator 11 and the axis of deflection rotates in synchronism with shaft 19 and the elements connected thereto. The contactor unit 22 is designed to produce a trigger voltage impulse when shaft 19 traverses a fixed reference angular position and transmits said trigger to a delayed gate generator 26 which produces an approximately rectangular gate voltage output after a predetermined time delay subsequent to the occurrence of said trigger from the contactor unit 22. Mechanical means, such as a shaft 35 connected to a hand wheel 36, are provided for adjustably controlling the magnitude of said gate time delay between limits separated by a time interval at least as great as the period of rotation of shaft 19. The time duration of said gate voltage is at least as great as the period of the sine wave oscillator 11. The output voltage of the sine wave oscillator 11 is applied to a delayed trigger generator 27 which produces a trigger voltage impulse once during each cycle of the sine wave voltage after a predetermined time delay subsequent to the start of each cycle. Mechanical means, such as a shaft 37 connected to a hand wheel 38, are provided for adjustably controlling the magnitude of said trigger time delay between limits separated by a time interval of approximately one-fourth of the period of the sine wave oscillations. The delayed gate and the delayed trigger are applied to the mark generator 28 which is operative when the delayed gate and the delayed trigger occur coincidentally to produce an output signal impulse or group of impulses having a time duration short in comparison with the period of the sine wave oscillation. The output voltage of the mark generator is applied between control grid 39 and cathode 41 of the cathode-ray tube 18 in such manner as to cause an intensification of the electron beam in accordance with the output voltage impulses, thereby producing a radial luminescent mark on the screen of said tube. Corresponding elements of a plurality of stations 23, 24 may be electrically interconnected by means of a cable 29 so that marks produced at each station will appear synchronously in the same relative positions on the screens of all the cathode-ray tubes 18.

Fig. 3 illustrates the appearance of the cathode-ray tube screens in a system comprising three stations in which the generator at each station produces marks *a*, *b*, *c*, having distinctive identifying length characteristics.

From the foregoing description it will be understood that the angular position of a mark is determined by the amount of time delay between the occurrence of the trigger voltage impulse produced by the contactor unit and the occurrence of the gate produced by the delayed gate generator. Similarly, the radial distance of a mark from the center of rotation of the electron beam deflection is determined by the amount of time delay between the start of a cycle of oscillation of the sine wave voltage and the occurrence of the trigger produced by the delayed trigger generator. Consequently, any station in the system may transmit intelligence to all other stations in the system in accordance with the coordinates of the position of its reference indication.

A system in accordance with the invention may, for example, be used to indicate at a plurality of remote points, the train and elevation of a gun, the train and elevation mechanisms of said gun being mechanically linked with shafts 35 and 37 respectively. For example, Fig. 4 is a representation of a gun 121 and its mount comprising a carriage 122 and trunnions 123. The gun 121 is trained by turning the carriage 122 about a vertical axis, causing a corresponding rotation of shaft 35 through mechanical coupling which may comprise a gear 124. Shaft 37 is mechanically coupled to the trunnion 123. Thus, the angular position of shaft 37 corresponds to the elevation of the gun 121 and, consequently, to the range of a projectile fired from the gun 121. When used in such manner the angular position of the corresponding mark is an indication of the train and the radial position of said mark is an indication of the gun elevation.

Fig. 5 illustrates possible embodiments of contactor unit 22 and delayed gate generator 26. Contactor unit 22 comprises a rotatable contact 31 conductively connected to ground and mechanically arranged in fixed relationship to shaft 19 to rotate synchronously therewith, a fixed contact 32, a source of D. C. voltage, E, resistors 34, 42, capacitor 33, and diode 35. Delayed gate generator 26 comprises a single cycle multivibrator including tubes 51, 52 and associated components, and another single cycle multivibrator including tubes 53, 54 and associated components. Fixed contact 32 is arranged to engage rotating contact 31 when shaft 19 traverses a fixed reference angle. At that instant condenser 33 has been charged to a negative potential E through resistor 42. When contact 31 engages contact 32, condenser 33 discharges rapidly through resistor 34 which with condenser 33 forms a differentiating circuit. There results a positive voltage impulse at the ungrounded end of resistor 34 which is applied to the grid 56 of tube 51, which is normally biased beyond plate current cut-off by the flow of the plate current of tube 52 through cathode resistor 57. Said positive voltage impulse at the grid 56 of tube 51 drives grid 56 above cut-off, causing tube 51 to conduct plate current. The resulting negative increment of voltage at the plate 58 is coupled through capacitor 59 to the grid 61 of tube 52, thereby cutting off the flow of plate current in tube 52. Immediately capacitor 59 begins to discharge through a circuit including variable resistor 62. As condenser 59 discharges, the grid 61 potential rises exponentially with respect to time until cut-off potential is reached, at which time tube 52 conducts plate current which flows through resistor 57, thereby cutting off the flow of plate current in tube 51 and restoring the circuit to its original condition of equilibrium. Thus, at the time tube 51 is cut off a positive voltage increment occurs at the plate 58 as the plate voltage rises to its original value. The plate 58 of tube 51 is coupled through a differentiating circuit comprising a capacitor 63 and a resistor 64 to the grid 66 of tube 53. The positive increment of voltage at the plate of tube 51 produces a positive voltage impulse which triggers the single cycle multivibrator comprising tubes 53 and 54. Thus, plate current through tube 54 is cut off for a period of time determined by the time constant of the discharge circuit of condenser 67 which includes resistor 68. Said circuit is designed so that tube 54 remains cut off for a period of time at least as great as the period of the sine wave oscillator. Consequently, there occurs a positive rectangular voltage impulse at the plate 69 of tube 54 which is coupled through a condenser 71 to the mark generator 28, said impulse constituting a gate voltage for the mark generator 28. The variable resistor 62 is adjustable by rotation of shaft 35 by mechanical means, such as a hand wheel 36, to control the time constant of discharge of condenser 59. Means are thereby provided for adjustably controlling the time delay of the delayed gate subsequent to the occurrence of the trigger voltage from the contactor unit 22. When contacts 31 and 32 disengage, diode 35 conducts the charging current to capacitor 33, thereby limiting the magnitude of the negative impulse output of the contactor unit 22 to a very small value which is insufficient to affect the operation of the delayed gate generator 26.

Referring now to Fig. 6, there is shown a schematic diagram of delayed trigger generator 27. Tube 71 is biased midway between zero and cut-off potential by means of a negative voltage source 72 and is overdriven by the voltage from the sine wave oscillator which is coupled to the grid 73 through a coupling circuit comprising capacitor 74 and resistor 76. Series grid resistor 77 prevents the grid 73 from being driven appreciably above zero potential during the positive half cycle of the sine wave oscillation. The negative half cycle drives grid 73 below cut-off potential; consequently, the output voltage of tube 71 which is developed across plate-load resistor 78 is of approximately rectangular wave form with respect to time and the increments of said output voltage occur substantially at the start of each half cycle of the sine wave oscillations. The output voltage of tube 71 is coupled through a differentiating circuit comprising capacitor 79 and resistor 81 to the grid 82 of tube 83. Series grid resistor 84 limits the positive grid voltage substantially to zero so that only the negative peaks of voltage from the differentiating circuit are effective to cause variation of the plate current of tube 83. The output voltage of tube 83 developed across plate-load resistor 86 therefore comprises a positive voltage impulse occurring at the start of each cycle of the sine wave oscillation and is coupled through capacitor 87 to the grid 88 of tube 89 to trigger a single cycle multivibrator comprising tubes 89, 91 and associated components. Thus a negative rectangular voltage impulse is produced at the plate 92 of tube 89. The time duration of said negative impulse is determined by the time constant of the discharge circuit of variable condenser 93; that is, the time delay between the occurrence of the positive trigger at the grid 88 of tube 89 and the occurrence of the positive increment of voltage at the plate 92 of tube 88 as the multivibrator returns to its normal condition of equilibrium is determined by the time constant of the discharge circuit of condenser 93. The plate 92 of tube 89 is connected through a differentiating circuit comprising condenser 94 and resistor 96 to the mark generator 28, which is triggered by the positive impulse of voltage derived from the positive increment of voltage at the plate 92 of tube 89 by the differentiating circuit 94, 96. Variation of the time delay of the occurrence of the trigger voltage output of the delayed trigger generator is effected by variation of the capacity of condenser 93 by mechanical means, such as a hand wheel 38 and a shaft 37 mechanically coupled to the variable element of condenser 93.

Fig. 7 illustrates the system of Fig. 2 in combination with a radio locator system. Said radio locator system comprises a transmitter 101, a receiver 102, and a directional antenna 103. The direction of antenna 103 is rotated by shaft 19. The transmitter functions to generate pulses of high frequency energy in synchronism with the sine wave oscillator 11, said pulses occurring once each cycle of the oscillator 11. An adjustable phase shifter 104 is provided between the sine wave oscillator and the transmitter 101, whereby the pulses generated by the transmitter 101 may be caused to occur as the deflection of the cathode ray passes through the axis of rotation of the sweep. The phase shift is manually adjustable by means of, for example, an adjusting screw 105. The transmitted pulses are radiated from directional antenna 103 in a narrow beam. When said pulses are reflected from a remote object, the antenna receives said reflected pulses which are detected by the receiver 102. Receiver 102 produces video pulses in response to the received pulses of high frequency energy reflected from remote objects and applies said video pulses between the control grid and cathodes of cathode-ray tubes 18 to intensify the electron beams of said tubes and thereby produce a luminescent spot on the screens of said tubes. The angular position of said luminescent spot indicates the relative azimuth of the remote object and the radial distance of said spot from the center of rotation of the deflection axis of the electron beam in an indication of the range of said object.

The angular rotation of shafts 35 and 37 may be calibrated in terms of azimuth and range respectively so that when a mark is positioned by means of said shafts to coincide with the luminescent spot indication of a remote object, the exact bearing and range of said object may be read directly. Similarly, a station may call the attention of other stations to a particular indication of a remote object by positioning its marker to coincide with said indication. Or, shafts 35 and 37 may be operated respectively by the train and elevation mechanisms of gun 121, Fig. 4, so that the corresponding marker indicates the point at which a projectile fired by said gun will strike. Furthermore, the gun may be aimed at a particular remote object by adjusting its train and elevation so that its marker coincides with the indication of said object on the screens of the cathode-ray tubes, and the visual indication at all stations in the system will simultaneously show that the gun is aimed at said remote object.

The mark generator 28 may comprise a squegging oscillator, such as is shown in Fig. 8, which is responsive to the coincidal occurrence of the delayed gate and the delayed trigger to produce an electrical impulse of predetermined duration. In Fig. 8 the squegging oscillator comprises an electron tube 131 having three grids 132, 133, 134. Grids 132, 133 are connected through resistors 135, 135 to a source 136 of negative bias voltage. The bias applied to each of the grids 132, 133 is independently sufficient to prevent the flow of plate current in the tube 131. Thus, in order for the tube 131 to conduct plate current, the voltage of grids 132, 133 must simultaneously be shifted in the positive direction. This shift is caused to occur by coupling the output of the delayed gate generator 26 to grid 132 through terminal 137 and coupling condenser 138. Similarly, the output of the delayed trigger generator 27 is coupled to grid 133 through terminal 139 and coupling condenser 140. Thus, when the delayed gate and the delayed trigger occur coincidentally, the voltage of both grids are shifted in a positive direction, causing plate current to flow in the tube 131. The circuit then operates as a squegging oscillator. That is, the flow of plate current through coil 141 induces a positive increment of voltage at grid 134, resulting in a cumulative increase of plate current which continues to flow during a time interval determined by the constants of the circuit components, especially the coil 141 and the grid condenser 142. The increment of plate current in the coil 141 induces a voltage in the secondary winding 143 said voltage being applied with positive polarity to control grid 42 of cathode-ray tube 18, resulting in an increased intensity of the cathode ray beam. The mark on the screen of the cathode-ray tube 18 may be made any desired length by selecting appropriate values for the capacitance of condenser 142 and for the inductance of the coil 141. At the termination of the flow of plate current through the tube 131, grid condenser 142 has acquired a charge which leaks off slowly through the grid leak 144. The resulting voltage drop across the grid leak 144 biases grid 134 sufficiently negative to prevent the self-initiation of a succeeding impulse of plate current. By the time a succeeding gate impulse is applied to the circuit, condenser 142 has discharged and the circuit is again responsive to coincidental application of a gate and a trigger as hereinbefore described.

It will be understood that the invention is not limited by the embodiment herein illustrated and described.

The invention described herein may be manufactured and used by or for the Government of the United States of America for governmental purposes without the payment of any royalties thereon or therefor.

What is claimed is:

1. A visual communication system comprising, a synchro generator and means for rotating the field winding thereof relative to the armature at substantially constant angular velocity, a source of electrical oscillations having substantially constant frequency much greater than the frequency of rotation of said field winding, means for exciting the field winding with said oscillations, a synchro motor armature electrically connected to the armature of the synchro generator whereby a magnetic field induced in the armature alternates synchronously with said oscillation and rotates synchronously with the rotation of said field winding, a cathode-ray tube positioned in said magnetic field whereby the cathode ray in said tube is subject to transverse deflection by said field, means for producing an electrical discontinuity at a reference phase of said rotation, means for adjustably delaying said discontinuity, means for producing an electrical impulse at a reference phase of said oscillation, means for adjustably delaying said impulse, means responsive to a coincidental occurrence of said discontinuity and said impulse to produce a signal of predetermined duration, means for biasing the cathode-ray tube with the signal whereby a visual signal is produced on the screen of said cathode-ray tube, and means for synchronously reproducing the visual signal on the screens of additional cathode-ray tubes.

2. In combination, a visual communication system in accordance with claim 1 and, a pulse echo ranging and direction finding apparatus comprising, a directional beam antenna, means for rotating the antenna synchronously with said synchro generator field winding, transmitter means for applying short pulses of high frequency energy to the antenna, means for maintaining a constant phase relationship between the occurrence of a reference angle of sai doscillations and the occurrence of each energy pulse at the antenna, means for receiving each energy pulse reflected from remote objects, means for applying the received pulses as bias to the cathode-ray tubes whereby the received pulse produces a variation of the intensity of the cathode rays.

3. The visual indication system comprising a cathode ray tube, sweep generator means operative to generate a rotating oscillating magnetic field in said tube, means for producing an electrical discontinuity at a reference phase of said rotation, means for adjustably delaying said discontinuity, means for producing an electrical impulse at a reference phase of the said oscillation, means for adjustably delaying said impulse, means responsive to a coincidental occurrence of said discontinuity and said impulse to produce a signal of predetermined duration, and means for biasing the cathode ray tube with the signal whereby a visual indication is produced on the screen of said cathode ray tube.

References Cited in the file of this patent

UNITED STATES PATENTS

| | | |
|---|---|---|
| 2,406,858 | Shepherd et al. | Sept. 3, 1946 |
| 2,409,456 | Tolson | Oct. 15, 1946 |
| 2,412,291 | Schade | Dec. 10, 1946 |
| 2,415,566 | Rhea | Feb. 11, 1947 |
| 2,421,747 | Engelhart | June 10, 1947 |
| 2,422,100 | Huff | June 10, 1947 |
| 2,422,697 | Meacham | June 24, 1947 |
| 2,450,341 | Hershberger | Sept. 28, 1948 |
| 2,512,703 | Wilkerson | June 27, 1950 |